Dec. 17, 1968 L. W. PINAIRE ET AL 3,416,754
VECTORABLE EXHAUST NOZZLE
Filed May 19, 1966 2 Sheets-Sheet 1

INVENTORS
LONNIE W. PINAIRE
ALFRED LINGEN
ATTORNEY

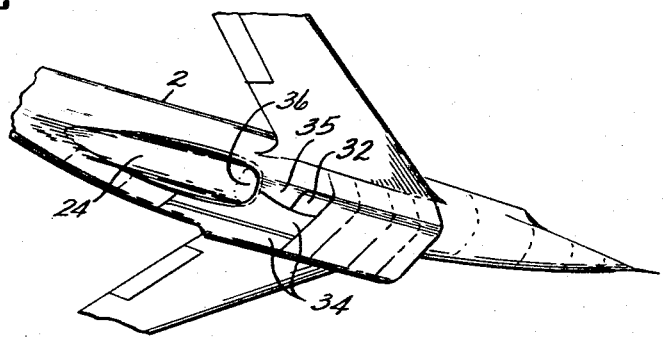
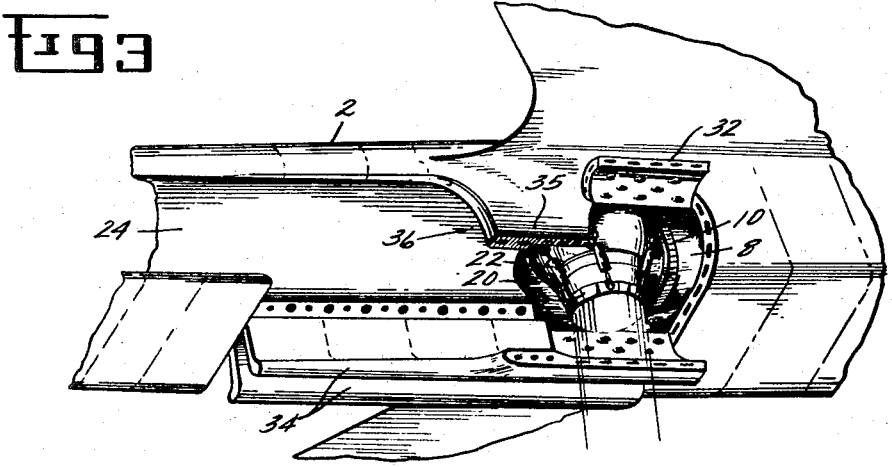
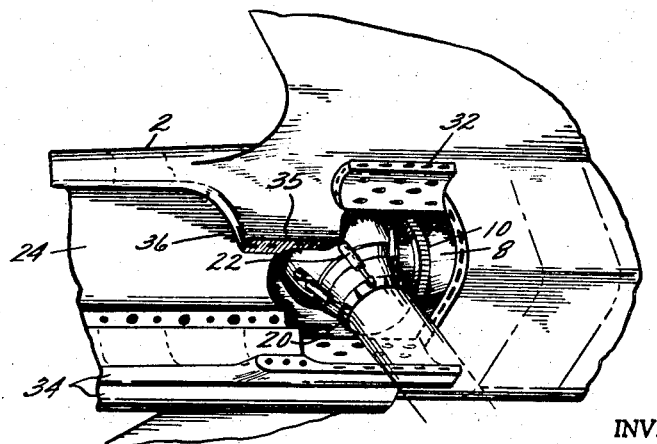

United States Patent Office 3,416,754
Patented Dec. 17, 1968

3,416,754
VECTORABLE EXHAUST NOZZLE
Lonnie W. Pinaire, Loveland, and Alfred Lingen, Cincinnati, Ohio, assignors to General Electric Company, a corporation of New York
Filed May 19, 1966, Ser. No. 551,397
3 Claims. (Cl. 244—55)

ABSTRACT OF THE DISCLOSURE

A V/STOL aircraft is provided with a propulsion system which comprises a pair of symmetrically disposed elbow-shaped nozzle structures. The nozzle structures are rotatable to provide thrust for both vertical and forward propulsion. Expansion surfaces surround each of said nozzles and are comprised of upper and lower movable flaps to accommodate rotation of the nozzles.

---

The present invention relates to a movable thrust nozzle structure and, more particularly, to a thrust vectorable nozzle for use in an aircraft capable of vertical takeoff and landing or short takeoff and landing (V/STOL).

In aircraft of this character, V/STOL capability is achieved by fitting the cruise engine or engines with movable exhaust nozzles so that the exhaust jets can be directed rearward for cruise operation, angled downward for V/STOL operation, and turned forward for reverse thrust. The aircraft may be equipped with conventional gas generators to provide the necessary thrust jets. Generally, an equal number of exhaust gas outlets are provided on each side of the aircraft in the form of twin nozzles which may be rotatable cascade members, elbow-shaped nozzles, or any other suitable conduits which efficiently conduct the exhaust gases in the desired direction.

One of the main problems in providing suitable nozzle means that may be used to provide thrust in widely varying directions from cruise to reverse thrust has been the inability to satisfactorily provide structure which enables the nozzle to present a smooth, unobstructed surface with the aircraft fairing or skin in the cruise position and also be adaptable to redirect, by rotation or otherwise, exhaust gases in different directions without disturbing the contours of the aircraft to an unsatisfactory degree such that aerodynamics problems are encountered.

In addition to the desirability of providing a vectorable nozzle which does not disturb the contours of the aircraft there are a number of other objectives which are important. First it is desirable that the exhaust nozzle have a complete range of vectoring including forward flight, a V/STOL position and a reverse thrust position. In addition, the nozzle should be one which can be accommodated in a gas generator having an afterburner or other augmentation capability. Further, in order to provide for optimum control of the aircraft the arrangement should be such that no vertical force thrust component is present when the nozzle is in the forward flight or full reverse thrust modes.

Therefore, it is an object of this invention to provide a movable nozzle structure which may be accommodated in an aircraft without excessively disturbing the contours of the aircraft.

Another object of this invention is to provide a novel movable nozzle structure which is especially applicable to symmetrical installation in an aircraft.

A further object of this invention is to provide a novel movable nozzle structure which can be accommodated in a gas generator having augmentation capability and is at the same time capable of a complete range of vectoring.

A still further object of this invention is to provide a novel movable nozzle structure which when vectored to a desired position provides thrust substantially only in the desired direction.

In one embodiment the invention may be constituted by a rotatable nozzle structure which includes the means for attaching the structure to a gas generator and providing diverging paths for flow of fluid from the generator. A bearing assembly is provided in the structure in each fluid flow path and an exhaust nozzle is supported by each bearing for rotation. In another aspect of this invention there is provided an expansion surface which has a portion movable to accommodate the rotation of the exhaust nozzle and provides for supersonic performance.

The invention is set forth in the claims and an embodiment of the invention is described in detail so that additional objects of this invention and its advantages may be understood. The description is to be taken in conjunction with the drawings in which:

FIGURE 2 is a partial side view of an aircraft illustrating the invention mounted thereon;

FIGURE 3 is a partial side view of an aircraft wherein a nozzle according to the invention has been rotated to the V/STOL position; and FIGURE 4 is a view similar to FIGURE 3 wherein a nozzle according to the invention is rotated to reverse thrust position.

Figure 1:
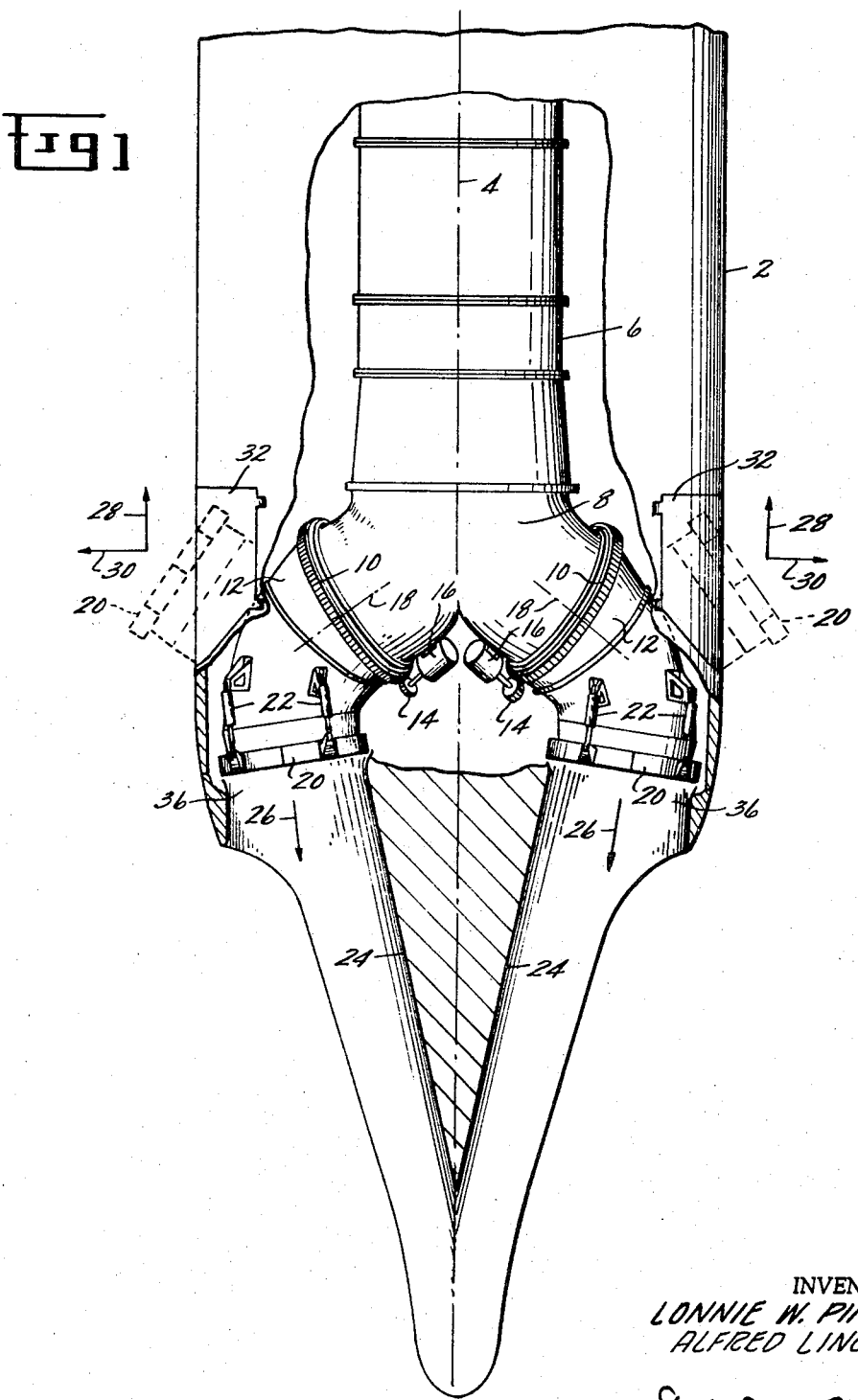
FIGURE 1 is a plan view, partially in section of a portion of an aircraft structure and an embodiment of the invention.

FIGURE 1 of the drawing illustrates how a nozzle structure according to the invention may be mounted in a portion 2 of an aircraft which in the figure may be taken to be the fuselage. It should be understood that the reference to mounting in a fuselage is an illustration only for it could be mounted in a pod and suspended at an appropriate place on the aircraft as for instance on the wings thereof. Mounted symmetrically with respect to the center line 4 of the aircraft portion 2 is a gas generator means 6 which may be any conventional arrangement as desired including dual or single installations as shown for purposes of the description. Secured to the gas generator 6 is a means for providing diverging paths for the fluid flow constituted by Y-shaped dome member 8. In each of the short legs of the dome member 8 a rotatable bearing assembly 10 is provided. Each bearing assembly is positioned so that the angle enclosed between the plane of the bearing assembly and the center line of the aircraft is an acute angle. Mounted for rotation with each bearing assembly 10 is an elbow-shaped duct 12 which converge toward their exits to form nozzles. The bearing assembly is constituted so as to effectively seal the connection between the Y-shaped dome 8 and the elbow-shaped ducts 12. In addition, each bearing assembly is provided with a gear means 14 arranged to be driven by a motor 16 so that each elbow-shaped duct may be rotated about an axis 18.

To provide for exhaust nozzle area variation each elbow-shaped duct 12 has provided on the end thereof a variable flap assembly 20 each of which may be controlled in any position of duct 12 by fluid motors such as shown at 22. In this manner the exhaust area may be varied for aircraft control purposes. In order that the aircraft may be capable of efficient supersonic flight an expansion surface is provided for each nozzle. The expansion surfaces are formed as diverging surfaces from the exits of the converging nozzles to provide for the development of additional thrust. This surface is formed in part by the aircraft fuselage as shown at 24 and also in part by means to be described in connection with FIGURE 2 below.

In FIGURE 1 the nozzles are shown in solid lines as being vectored to the rear of the aircraft structure so as to provide rearwardly directed thrust for operation in the forward flight mode. The arrows 26 represent the direction of the thrust in this mode and it may be seen that whatever component of thrust which is developed normal to the center line of the aircraft is cancelled out so that symmetrical forward thrust about the center line 4 is provided. FIGURE 1 also illustrates in dotted lines the position of the nozzles when the elbow-shaped ducts 12 have been rotated about the axis 18 for approximately 180°. The nozzles now open toward the front of the aircraft structure and provide a thrust having a forward component 28 and a normal component 30. As may be seen the normal components 30 are equal and opposite and cancel each other out so that only the forward components 28 remain to provide symmetrical reverse thrust.

In FIGURE 2 the expansion surface is formed in part by the shaped fuselage portion 24 and also in part by the inner surfaces of an upper movable flap 32 a lower movable flap 34 and the inner surface of a portion 35 of the fuselage 2 which is faired outwardly to encompass the nozzle. The inner surfaces of the flaps 32 and 34 and the portion 35 are shaped so that with the portion 24 a diverging expansion surface is provided from the exit of the nozzle. The expansion surface thus provided permits further controlled expansion of the fluid from the nozzle so that additional rearward thrust is provided. The flaps 32 and 34 are contoured so that when they are in their closed position as shown in FIGURE 2 they blend with the surface of the aircraft portion 2 so as to provide good aerodynamic qualities. In this figure the exhaust nozzle is behind the movable flaps 32 and 34 and the fluid issuing therefrom passes from the opening 36 which is formed by the surface 24 in conjunction with flaps 32 and 34 and portion 35. This is the arrangement of the parts of the invention when the aircraft is in the cruise or forward flight mode.

When it is desired to operate the aircraft in the V/STOL mode then the flap 32 may be partially opened by a suitable means and the flap 34 fully opened in the downward position illustrated in FIGURE 3. The motors 16 may then be opened to rotate the bearing structures 10 through the gearing 14 so as to move the elbow-shaped ducts 90° about the axis 18. The nozzle then assumes the position illustrated in FIGURE 3 wherein the thrust from each nozzle has only a vertical component.

When it is desired to position the nozzles for the reverse thrust mode the flaps 32 and 34 are opened as shown in FIGURE 4 and the motors 16 rotate the bearing structures 10 180° so that the nozzles assume the position illustrated in FIGURE 4 and also shown in FIGURE 1 in dotted lines.

The arrangement illustrated provides a thrust vectorable nozzle which is capable of a complete range of vectoring and which when positioned in any of its modes provides thrust components only in the desired direction.

What we claim as new and desire to secure by Letters Patent of the United States is:

1. For use with an aircraft having gas generator means symmetrically disposed with respect to the center line of a portion thereof:
    means for dividing the gas from said generator into two paths on opposite sides of said center line;
    rotatable means mounted in said paths on opposite sides of said center line on said dividing means and rotatable in planes at acute angles thereto;
    an elbow-shaped nozzle structure mounted on each of said rotatable means for rotation therewith so that the openings thereof may be vectored over a wide range of positions; and
    an expansion surface surrounding each of said nozzle structures, each expansion surface comprising an upper movable flap and a lower movable flap to accommodate the rotation of each of said nozzle structures from rearward opening to downward and forward opening positions.

2. The combination of claim 1 wherein:
    the dividing means comprises a Y-shaped dome having legs extending on either side of said center line; and
    the rotatable means comprises rotatable bearings each driven by motor means.

3. The combination of claim 1 wherein said expansion surfaces are constituted by portions of the aircraft structure and a pair of movable flaps which when in one position together with said portions of said aircraft structure form surfaces diverging from the exits of said nozzles.

References Cited

UNITED STATES PATENTS

| 3,025,667 | 3/1962  | Moorehead      | 60—35.55 |
| 3,067,579 | 12/1962 | Olbrich        | 60—232   |
| 3,088,275 | 5/1963  | Marchant et al.| 60—35.55 |
| 3,154,916 | 11/1964 | Eichholtz      | 244—56 X |
| 3,117,750 | 1/1964  | Snell          | 244—23   |
| 3,266,245 | 8/1966  | Mullins        | 244—52 X |

FOREIGN PATENTS 1,019,303    2/1966    Great Britain.

FERGUS S. MIDDLETON, *Primary Examiner.*

J. E. PITTENGER, *Assistant Examiner.*

U.S. Cl. X.R.

60—232; 239—265.35